(12) United States Patent
Koga et al.

(10) Patent No.: US 7,148,313 B2
(45) Date of Patent: Dec. 12, 2006

(54) POLYCARBONATE RESIN COMPOSITION AND MOLDED ARTICLES THEREOF

(75) Inventors: Takashi Koga, Chiyoda-ku (JP); Daisuke Takahashi, Chiyoda-ku (JP); Mitsuhiro Takeo, Tokyo (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 10/885,739

(22) Filed: Jul. 8, 2004

(65) Prior Publication Data

US 2005/0215750 A1 Sep. 29, 2005

Related U.S. Application Data

(63) Continuation-in-part of application No. 10/809,456, filed on Mar. 26, 2004, now abandoned.

(51) Int. Cl.
*C08G 63/00* (2006.01)

(52) U.S. Cl. .................. 528/196; 264/176.1; 264/219; 528/191; 528/198

(58) Field of Classification Search ............. 264/176.1, 264/219; 544/105; 528/191, 196, 198
See application file for complete search history.

(56) References Cited

U.S. PATENT DOCUMENTS

| | | | |
|---|---|---|---|
| 4,446,262 A | 5/1984 | Okumura et al. | |
| 5,783,307 A | 7/1998 | Fagerburg et al. | |
| 5,849,820 A | 12/1998 | Kim et al. | |
| 6,359,042 B1 | 3/2002 | Anders et al. | |
| 2001/0034419 A1 * | 10/2001 | Kanayama et al. | 525/439 |
| 2003/0083207 A1 | 5/2003 | Gorny et al. | |
| 2003/0130382 A1 | 7/2003 | Osaki et al. | |
| 2003/0180542 A1 | 9/2003 | Pickett et al. | |

FOREIGN PATENT DOCUMENTS

| | | |
|---|---|---|
| CA | 2 452 455 | 11/2003 |
| JP | 5912952 | * 1/1984 |
| JP | 07-009560 | 1/1995 |
| JP | 10-044356 | 2/1998 |
| JP | 10-138435 | 5/1998 |
| WO | 01/90233 | 11/2001 |
| WO | 01/90244 | 11/2001 |
| WO | 03/035735 | 5/2003 |

* cited by examiner

*Primary Examiner*—Terressa Boykin
(74) *Attorney, Agent, or Firm*—Wenderoth, Lind & Ponack, L.L.P.

(57) ABSTRACT

A polycarbonate resin composition comprising 100 parts by weight of a polycarbonate resin (component A), 0.01 to 10 parts by weight of at least one ultraviolet light absorber (component B) selected from the group of a specific cyclic imino ester, and 0.01 to 1 part by weight of a fatty acid ester compound (component C) which is an ester of a polyhydric alcohol and an aliphatic carboxylic acid and has a molecular weight of 500 to 2,000 g/mol, as well as molded articles thereof.

The polycarbonate resin composition provides molded articles having excellent transparency, color and resistance to ultraviolet radiation, is excellent in heat stability at the time of molding and releasability and fully suppresses the production of a deposit on a metal mold.

13 Claims, 2 Drawing Sheets

[1-A]

[1-B]

POLYCARBONATE RESIN COMPOSITION AND MOLDED ARTICLES THEREOF

CROSS-REFERENCE TO RELATED APPLICATIONS

This application is a continuation-in-part of application U.S. Ser. No. 10/809,456 filed on Mar. 26, 2004 now abandoned.

FIELD OF THE INVENTION

The present invention relates to a polycarbonate resin composition which comprises an ultraviolet light absorber having a specific structure and a specific fatty acid ester compound and to molded articles thereof. More specifically, it relates to a polycarbonate resin composition having high utility characterized in that (i) its molded articles have excellent resistance to ultraviolet radiation, (ii) it has excellent releasability from a metal mold at the time of molding, (iii) the production of a deposit on a metal mold which occurs on the mirror surface, sliding part and vent part of a metal mold can be greatly suppressed during injection molding, (iv) it has excellent heat stability at the time of molding, and (v) its molded articles have excellent transparency and color as it contains the above specific ultraviolet light absorber and fatty acid ester compound, and to molded articles thereof. Specifically, it relates to a transparent member for vehicles made of the polycarbonate resin composition.

DESCRIPTION OF THE PRIOR ART

Polycarbonate resins are used for many purposes because they have excellent transparency, impact resistance, heat resistance and flame retardancy. In recent years, they have been widely used for outdoor applications such as sheet materials and window glass materials. However, it is known that when they are used outdoors for a long time, they become inferior in color, transparency and mechanical properties due to deterioration by ultraviolet radiation. As means of improving resistance to ultraviolet radiation, there are widely known methods such as one in which a polycarbonate resin is mixed with an ultraviolet light absorber and one in which the surface of a polycarbonate molded article is laminated or coated with a resin (polycarbonate resin, other acrylic resin, etc.) comprising an ultraviolet light absorber.

For the injection molding of a polycarbonate resin, a method in which a parting agent is mixed with a resin itself is widely used to improve releasability from a metal mold at the time of melt molding.

A large number of ultraviolet light absorbers and parting agents have been disclosed and actually used up till now. However, as these additives are readily volatilized or decomposed when they are melt kneaded with a polycarbonate resin or when a resin composition obtained by melt kneading a polycarbonate resin with these additives is molded, they may cause various problems such as a molding failure, e.g., a silver streak phenomenon or discoloration, the production of a deposit on a metal mold and a transfer failure to the surface of a molded article.

Particularly for the formation of transparent members for vehicles typified by head lamp lenses and glazing materials, these members are becoming lighter, thinner and larger in size, and the resin temperature at the time of molding is raised higher and higher so as to improve productivity. As a result, the above problems are becoming more and more serious. Since an extremely good appearance is required for these transparent members for vehicles, they are produced, paying close attention to eliminate the above problems.

Particularly, the above problem that a deposit is produced on a metal mold tends to become marked when a molded article typified by a head lamp lens (including plain lens, that is, a head lamp cover) is produced by using a metal mold having a complex structure. This is because a narrow path having a deposit thereon is formed more easily as the structure of a metal mold becomes more complex. The regular maintenance of a metal mold which is carried out to prevent a failure caused by a deposit on the metal mold takes a long time and greatly reduces productivity because the structure of the metal mold is complex. Therefore, the production of a deposit on a metal mold is a serious problem to be solved in the field of head lamp lenses. Meanwhile, the proportion defective of glazing materials tends to be large as they have an extremely large area even when the structure of a metal mold is not so complex as that of a head lamp lens. Consequently, the production of a deposit on a metal mold is also a serious problem to be solved in the field of glazing materials.

There have already been made a large number of proposals for an ultraviolet light absorber which is rarely decomposed or volatilized by heat and also rarely affects the color or heat stability of a resin.

There are known methods for forming a polycarbonate resin film having a high content of an ultraviolet light absorber with relatively low volatility on the surface of a polycarbonate resin molded article (JP-A 7-9560, JP-A 10-44356 and JP-A 10-138435) (the term "JP-A" as used herein means an "unexamined published Japanese patent application"). Although a molded article having relatively high resistance to ultraviolet radiation is obtained by these methods, it is difficult to form a film having uniform thickness without deteriorating the appearance of the molded article. Therefore, the shape of the molded article is very limited. The above methods can be actually used to produce only a molded article having a very limited shape such as a sheet material and are complicated in process with the result of low productivity.

There is known a resin composition having improved resistance to ultraviolet radiation which is prepared by blending a cyclic imino ester typified by 2,2'-p-phenylene bis(3,1-benzoxazin-4-one) (may be abbreviated as "CEIP" hereinafter) with a polycarbonate resin (U.S. Pat. No. 4,446, 262).

There is also known an ultraviolet radiation stabilized multi-layer structure which comprises an ultraviolet light protection layer made of a resin composition comprising a polycarbonate resin, cyclic imino ester and fluorescent brightener and a polycarbonate resin substrate layer (U.S. Pat. No. 5,783,307).

There are also known a resin composition comprising resorcinol arylate polyester and CEIP and/or 1,3-bis[(2-cyano-3,3-diphenylacryloyl)oxy]-2,2-bis[[(2-cyano-3,3-diphenylacryloyl)oxy]methyl]propane and a multi-layer molded product comprising a layer made of the composition and a polycarbonate resin layer (US 2003/0180542 A1).

A resin composition prepared by mixing CEIP with a polycarbonate resin and a resin composition prepared by mixing a specific amount of a specific phosphite-based stabilizer, hindered phenol-based stabilizer or lactone-based stabilizer with a polycarbonate resin are known (WO01/090244), and the above publication discloses the colors of molded products, color stabilities and UV stabilities of the above resin compositions and the loss of a UV additive.

A resin composition prepared by mixing CEIP and a specific hydroxybenzotriazole derivative, hydroxyphenyltriazine derivative or cyanoacrylate compound with a polycarbonate resin is known (WO01/090233). This publication also discloses the same characteristic properties as in the above publication of the resin composition.

However, it cannot be said that the above information is enough to solve the above problem, i.e., the production of a deposit on a metal mold. Although a polycarbonate resin composition constituting a transparent member for vehicles needs to be blended with a parting agent to no small extent, all of the above prior art documents fail to disclose information on the production of a deposit on a metal mold from the above composition.

SUMMARY OF THE INVENTION

It is an object of the present invention to provide a polycarbonate resin composition which provides a molded article having excellent transparency, color and resistance to ultraviolet radiation, has excellent heat stability and releasability at the time of molding and fully suppresses the production of a deposit on a metal mold as well as molded articles thereof, particularly transparent members for vehicles typified by head lamp lenses and glazing materials.

The inventors of the present invention have conducted intensive studies to attain the above object. As a result, they have found that the production of a deposit on a metal mold is not simply due to a reduction in the volatility and the molecular weight of an ultraviolet light absorber. Stated more specifically, they have found that the production of a deposit on a metal mold from a polycarbonate resin composition comprising a parting agent greatly differs according to the type of the parting agent and that the production of a deposit on a metal mold can be greatly suppressed by a combination of a specific ultraviolet light absorber and a specific parting agent.

They have known that the choice of a parting agent is important in solving the above problem and providing a more practical polycarbonate resin composition. When they have conducted further studies based on the above knowledge, they have found that the above problem can be solved by blending a specific amount of an ultraviolet light absorber having a specific structure and a specific amount of a specific fatty acid ester with a polycarbonate resin. The present invention has been accomplished based on this finding.

According to one aspect of the present invention, there is provided a polycarbonate resin composition comprising:
(1) 100 parts by weight of a polycarbonate resin (component A);
(2) 0.01 to 10 parts by weight of at least one ultraviolet light absorber (component B) selected from the group of a cyclic imino ester represented by the following general formula (I); and
(3) 0.01 to 1 part by weight of a fatty acid ester compound (component C) which is an ester of a polyhydric alcohol and an aliphatic carboxylic acid and has a molecular weight of 500 to 2,000 g/mol.

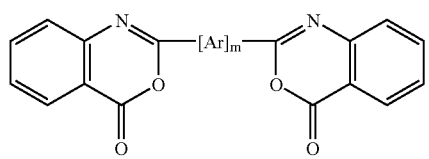

(I)

(wherein Ar is a divalent aromatic hydrocarbon residue having 6 to 12 carbon atoms, with the proviso that Ar may contain a hetero atom, and m is 0 or 1.)

According to another aspect of the present invention, there is provided a polycarbonate resin composition obtained by blending:
(1) 100 parts by weight of a polycarbonate resin (component A);
(2) 0.01 to 10 parts by weight of at least one ultraviolet light absorber (component B) selected from the group of a cyclic imino ester represented by the above general formula (I); and
(3) 0.01 to 1 part by weight of a fatty acid full ester compound (component C') which is a full ester of a polyhydric alcohol and an aliphatic carboxylic acid and has a molecular weight of 500 to 2,000 g/mol and an acid value of 4 to 20.

The above fatty acid ester is preferably a fatty acid full ester, more preferably a full ester of an aliphatic alcohol having 5 to 30 carbon atoms and 4 to 8 hydroxyl groups and an aliphatic carboxylic acid having 10 to 22 carbon atoms, much more preferably a full ester of pentaerythritol as the above aliphatic polyhydric alcohol and an aliphatic carboxylic acid.

Preferably, there is provided a melt molded article from the polycarbonate resin composition of the present invention. The molded article is preferably a transparent member for vehicles, particularly preferably a car lamp cover or lens or a car glazing material.

DETAILED DESCRIPTION OF THE PREFERRED EMBODIMENTS

Figure 1:
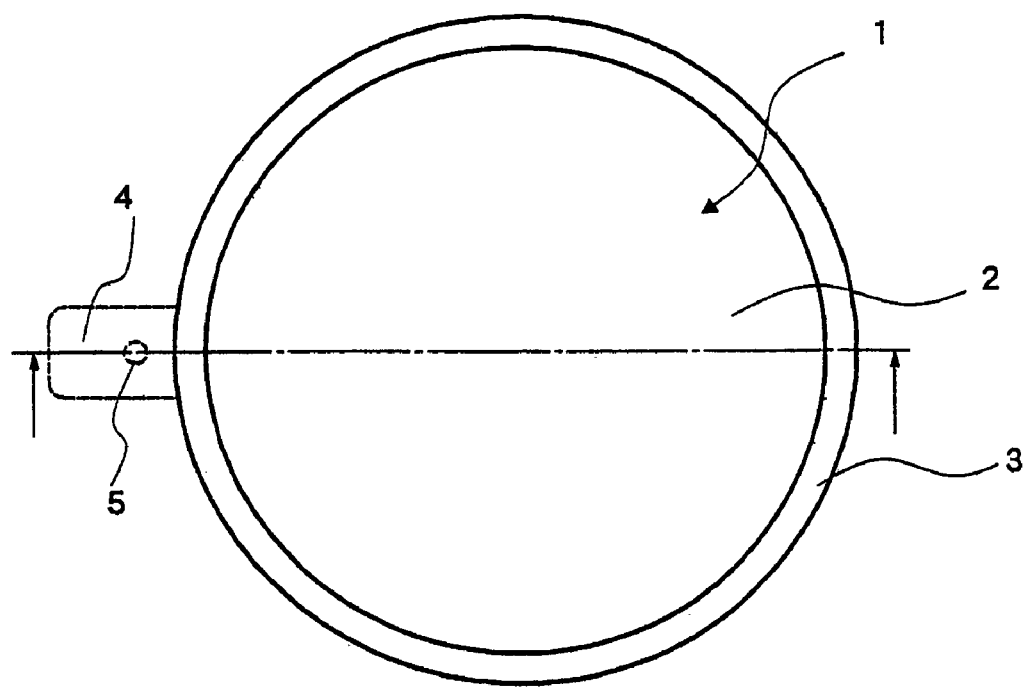
FIGS. 1 are diagrams of a molded plain car head lamp lens obtained in Examples which is shaped like a dome, wherein FIG. [1-A] is a front view (projection on the platen surface at the time of molding. Therefore, the area is the maximum projection area) and FIG. [1-B] is a sectional view cut on line A—A.
Figure 1:
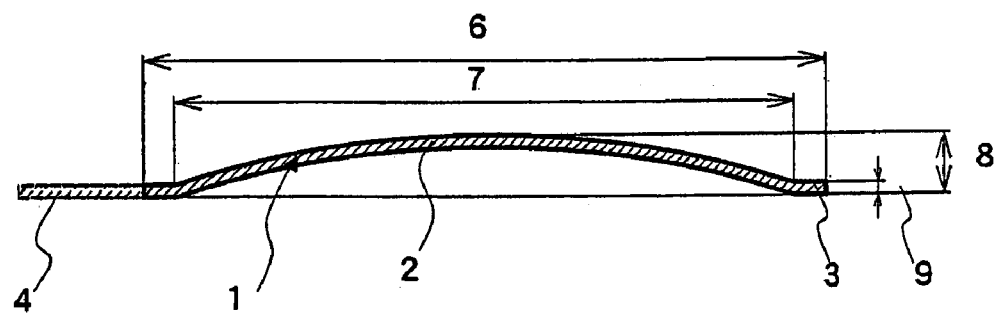

The present invention will be described in detail hereinunder.

<Component A>

The component A in the polycarbonate resin composition of the present invention is a polycarbonate resin which is the main ingredient of the resin-composition. A typical polycarbonate resin (may be simply referred to as "polycarbonate" hereinafter) is obtained by reacting a diphenol with a carbonate precursor, and the reaction is interfacial polycondensation, melt transesterification, the solid-phase transesterification of a carbonate prepolymer or the ring-opening polymerization of a cyclic carbonate compound.

Examples of the above diphenol include hydroquinone, resorcinol, 4,4'-biphenol, 1,1-bis(4-hydroxphenyl)ethane, 2,2-bis(4-hydroxyphenyl)propane (generally called "bisphenol A"), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1- bis(4-hydroxyphenyl)-3,3,5-trimethylcyclohexane, 2,2-bis (4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, 2,2-bis(3,5-dibromo-4-hydroxyphenyl)propane, bis(3,5-dibromo-4-hydroxyphenyl)sulfone, bis(4-hydroxy-3-methylphenyl)sulfide, 9,9-bis(4-hydroxyphenyl)fluorene and 9,9-bis(4-hydroxy-3-methylphenyl)fluorene. Out of these, bis (4-hydroxyphenyl)alkane, particularly bisphenol A (may be abbreviated as "BPA" hereinafter) is commonly used.

In the present invention, a special polycarbonate produced from a diphenol other than bisphenol A-based polycarbonates which are general-purpose polycarbonates may be used as the component A.

For example, a polycarbonate (homopolymer or copolymer) prepared by using 4,4'-(m-phenylenediisopropylidene) diphenol (may be abbreviated as "BPM" hereinafter), 1,1-bis(4-hydroxyphenyl)cyclohexane, 1,1-bis(4-hydroxyphenyl)-3,3,5-trimethylcyclohexane (may be abbreviated as "Bis-TMC" hereinafter), 9,9-bis(4-hydroxyphenyl)fluorene or 9,9-bis(4-hydroxy-3-methylphenyl) fluorene (may be abbreviated as "BCF" hereinafter) as part or all of the diphenol component is suitable for use in fields in which requirements for stability to dimensional change by water absorption and form stability are very severe. A diphenol other than BPA is used in an amount of preferably 5 mol % or more, particularly preferably 10 mol % or more based on the total of diphenol components constituting the polycarbonate.

Particularly when high stiffness and excellent resistance to hydrolysis are required, the component A constituting the resin composition is particularly preferably one of the following copolycarbonates (1) to (3).

(1) A copolycarbonate which comprises 20 to 80 mol % (preferably 40 to 75 mol %, more preferably 45 to 65 mol %) of BPM and 20 to 80 mol % (preferably 25 to 60 mol %, more preferably 35 to 55 mol %) of BCF based on 100 mol % of the total of diphenol components constituting the copolycarbonate.

(2) A copolycarbonate which comprises 10 to 95 mol % (preferably 50 to 90 mol %, more preferably 60 to 85 mol %) of BPA and 5 to 90 mol % (preferably 10 to 50 mol %, more preferably 15 to 40 mol %) of BCF based on 100 mol % of the total of diphenol components constituting the copolycarbonate.

(3) A copolycarbonate which comprises 20 to 80 mol % (preferably 40 to 75 mol %, more preferably 45 to 65 mol %) of BPM and 20 to 80 mol % (preferably 25 to 60 mol %, more preferably 35 to 55 mol %) of Bis-TMC based on 100 mol % of the total of diphenol components constituting the copolycarbonate.

These special polycarbonates may be used alone or in combination of two or more. They may be mixed with a commonly used bisphenol A type polycarbonate.

As for the production processes and characteristic properties of these special polycarbonates, refer to JP-A 6-172508, JP-A 8-27370, JP-A 2001-55435 and JP-A 2002-117580.

Out of the above polycarbonates, polycarbonates whose water absorption coefficient and Tg (glass transition temperature) have been adjusted to the following ranges by controlling their compositions have high resistance to hydrolysis and excellent resistance to warping after molding and are therefore particularly suitable for use in fields in which form stability is required.

(i) a polycarbonate having a water absorption coefficient of 0.05 to 0.15%, preferably 0.06 to 0.13% and a Tg of 120 to 180° C., or (ii) a polycarbonate having a Tg of 160 to 250° C., preferably 170 to 230° C. and a water absorption coefficient of 0.10 to 0.30%, preferably 0.13 to 0.30%, more preferably 0.14 to 0.27%.

The water absorption coefficient of a polycarbonate is a value obtained by measuring the moisture content of a disk-like specimen having a diameter of 45 mm and a thickness of 3.0 mm after the specimen is immersed in water at 23° C. for 24 hours in accordance with ISO62-1980. Tg (glass transition temperature) is a value obtained by measuring with a differential scanning calorimeter (DSC) in accordance with JIS K7121.

The carbonate precursor is a carbonyl halide, carbonate ester or haloformate, as exemplified by phosgene, diphenyl carbonates and dihaloformates of a diphenol.

For the production of a polycarbonate from a diphenol and a carbonate precursor by the interfacial polymerization process, a catalyst, terminal capping agent and antioxidant for preventing the oxidation of the diphenol may be optionally used. The polycarbonate may be a branched polycarbonate obtained by copolymerizing a polyfunctional aromatic compound having 3 or more hydroxyl groups. Examples of the polyfunctional aromatic compound having 3 or more hydroxyl groups used herein include 1,1,1-tris(4-hydroxyphenyl)ethane and 1,1,1-tris(3,5-dimethyl-4-hydroxyphenyl)ethane.

When a polyfunctional compound which forms a branched polycarbonate is contained, its amount is 0.001 to 1 mol %, preferably 0.005 to 0.9 mol %, particularly preferably 0.01 to 0.8 mol % based on the total-amount of the polycarbonate. Particularly in the case of the melt transesterification process, a branched structure may be formed as a side reaction. The amount of the branched structure is 0.001 to 1 mol %, preferably 0.005 to 0.9 mol %, particularly preferably 0.01 to 0.8 mol % based on the total amount of the polycarbonate. The amount of the branched structure can be calculated by $^1$H-NMR measurement.

The aromatic polycarbonate resin which is the component A of the resin composition of the present invention may be a polyester carbonate obtained by copolymerizing an aromatic or aliphatic (including alicyclic) dicarboxylic acid, copolycarbonate obtained by copolymerizing a dihydric alcohol (including alicyclic), or polyester carbonate obtained by copolymerizing the dicarboxylic acid and the dihydric alcohol. It may be a mixture of two or more of the above obtained polycarbonates.

The aliphatic dicarboxylic acid is preferably α,ω-dicarboxylic acid. Preferred examples of the aliphatic dicarboxylic acid include linear saturated aliphatic dicarboxylic acids such as sebacic acid (decanedioic acid), dodecanedioic acid, tetradecanedioic acid, octadecanedioic acid and icosanedioic acid; and alicyclic dicarboxylic acids such as cyclohexanedicarboxylic acid. The dihydric alcohol is preferably an alicyclic diol such as cyclohexane dimethanol, cyclohexane diol or tricyclodecane dimethanol.

Further, a copolymer of a polycarbonate and a polyorganosiloxane obtained by copolymerizing a polyorganosiloxane unit may also be used as the component A in the present invention.

The aromatic polycarbonate resin as the component A may be a mixture of two or more polycarbonates such as polycarbonates obtained from different diphenols, polycarbonates containing a branched component, polyester carbonates and copolymers of a polycarbonate and a polyorganosiloxane. Further, it may be a mixture of two or more polycarbonates produced by different processes or by using different terminal capping agents.

The polymerization reaction of a polycarbonate which is carried out by the interfacial polymerization process is generally a reaction between a diphenol and phosgene in the presence of an acid binder and an organic solvent. The acid binder is selected from an alkali metal hydroxide such as sodium hydroxide or potassium hydroxide and an amine compound such as pyridine. The organic solvent is a halogenated hydrocarbon such as methylene chloride or chlorobenzene. To promote the reaction, a catalyst selected from a tertiary amine, quaternary ammonium compound and quaternary phosphonium compound such as triethylamine, tetra-n-butylammonium bromide and tetra-n-butylphosphonium bromide may be used. The reaction temperature is generally 0 to 40° C., the reaction time is 10 minutes to 5 hours, and pH during the reaction is preferably maintained at 9 or more.

A terminal capping agent is generally used in the above polymerization reaction. The terminal capping agent is a monofunctional phenol. The monofunctional phenol is preferably phenol, p-tert-butylphenol or p-cumylphenol. The monofunctional phenol may be a monofunctional phenol whose nucleus is substituted by a long-chain alkyl group having 10 or more carbon atoms, such as decylphenol, dodecylphenol, tetradecylphenol, hexadecylphenol, octadecylphenol, eicosylphenol, docosylphenol or triacontylphenol. The phenol has the effect of improving flowability and resistance to hydrolysis. These terminal capping agents may be used alone or in combination of two or more.

The reaction which is carried out by the melt transesterification process is generally a transesterification reaction between a diphenol and a carbonate ester which is performed by mixing together the diphenol and carbonate ester in the presence of an inert gas under heating and distilling off the formed alcohol or phenol. The reaction temperature which differs according to the boiling point of the formed alcohol or phenol is 120 to 350° C. in most cases. In the latter stage of the reaction, the pressure of the reaction system is reduced to $1.33 \times 10^3$ to 13.3 Pa to make it easy to distill off the formed alcohol or phenol. The reaction time is generally 1 to 4 hours.

The above carbonate ester is an ester such as an aryl group having 6 to 10 carbon atoms which may have a substituent, aralkyl group or alkyl group having 1 to 4 carbon atoms, preferably diphenyl carbonate.

A polymerization catalyst may be used to accelerate the polymerization speed. Examples of the polymerization catalyst include alkali metal compounds such as sodium hydroxide, potassium hydroxide, and sodium and potassium salts of a diphenol; alkali earth metal compounds such as calcium hydroxide, barium hydroxide and magnesium hydroxide; and nitrogen-containing basic compounds such as tetramethylammonium hydroxide, tetraethylammonium hydroxide, trimethylamine and triethylamine. Further, catalysts used for an esterification reaction and transesterification reaction, such as alkoxides of an alkali (earth) metal, organic acid salts of an alkali (earth) metal, boron compounds, germanium compounds, antimony compounds, titanium compounds and zirconium compounds may also be used. The above catalysts may be used alone or in combination of two or more. The amount of the catalyst is preferably $1 \times 10^{-9}$ to $1 \times 10^{-5}$ equivalent, more preferably $1 \times 10^{-8}$ to $5 \times 10^{-6}$ equivalent based on 1 mol of the raw material diphenol.

To reduce the number of the phenolic terminal groups of the formed polycarbonate in the reaction which is carried out by the melt transesterification process, a compound such as 2-chlorophenylphenyl carbonate, 2-methoxycarbonylphenylphenyl carbonate or 2-ethoxycarbonylphenylphenyl carbonate may be added in the latter stage of the polycondensation reaction or after the end of the reaction.

In the melt transesterification process, a deactivator for neutralizing the activity of a catalyst is preferably used. The amount of the deactivator is preferably 0.5 to 50 mols based on 1 mol of the residual catalyst. The deactivator is suitably used in an amount of preferably 0.01 to 500 ppm, more preferably 0.01 to 300 ppm, particularly preferably 0.01 to 100 ppm based on the polycarbonate after polymerization. Preferred examples of the deactivator include phosphonium salts such as tetrabutylphosphonium dodecylbenzenesulfonate and ammonium salts such as tetraethylammonium dodecylbenzenesulfate.

The viscosity average molecular weight of the polycarbonate resin as the component A is not limited. However, when the viscosity average molecular weight is lower than 10,000, the strength lowers and when it is higher than 50,000, the moldability deteriorates. Therefore, the viscosity average molecular weight is preferably in the range of 10,000 to 50,000, more preferably 14,000 to 30,000, much more preferably 18,000 to 23,000. A polycarbonate having a viscosity average molecular weight outside the above range may be mixed in limits that the above range is retained. For example, a high molecular weight polycarbonate having a viscosity average molecular weight higher than 50,000 may be mixed.

The viscosity average molecular weight M in the present invention is calculated based on the following equation from the specific viscosity ($\eta sp$) of a solution containing 0.7 g of an aromatic polycarbonate resin dissolved in 100 ml of methylene chloride at 20° C. which is obtained with an Ostwald viscometer based on the following equation.

Specific viscosity $(\eta sp)=(t-t_0)/t_0$

[$t_0$ is a time (seconds) required for the dropping of methylene chloride and t is a time (seconds) required for the dropping of a sample solution]

$\eta_{sp}/c=[\eta]+0.45\times[\eta]^2 c$ ([$\eta$] represents an intrinsic viscosity)

$[\eta]=1.23\times 10^{-4} M^{0.83}$ $c=0.7$

To measure the viscosity average molecular weight of the resin composition of the present invention, the following procedure is taken. That is, the resin composition is dissolved in methylene chloride in a weight ratio of 1:20 to 1:30, soluble matter is collected from the resulting solution by filtration with celite, the solvent is removed, and the filtrate is fully dried to obtain the methylene chloride soluble matter in a solid state. 0.7 g of the solid is dissolved in 100 ml of methylene chloride to measure the specific viscosity ($\eta sp$) of the obtained solution at 20° C. with an Ostwald viscometer so as to calculate its viscosity average molecular weight M based on the above equation.

<Component B>

At least one ultraviolet light absorber selected from the group of a cyclic imino ester represented by the above general formula (I) is used as the component B in the present invention. The ultraviolet light absorber used in the polycarbonate resin composition slightly absorbs light having a visible range in most cases and therefore has a problem that the obtained molded article is colored, thereby reducing its light transmittance. However, as the component B used in the present invention have an absorption range on a short wavelength side, they rarely affect the color of the polycarbonate resin. Since they have relatively excellent ultraviolet light absorptivity, they can provide satisfactory resistance to ultraviolet radiation to a polycarbonate resin. They are ultraviolet light absorbers particularly preferred for use in car lamp covers and lenses and car glazing materials which must have high light transmittance and be well designed.

The component B in the present invention is represented by the above general formula (I). Examples of the component B include 2,2'-bis(3,1-benzoxazin-4-one) (m=0 in the above formula (I)), 2,2'-p-phenylenebis(3,1-benzoxazin-4-one), 2,2'-m-phenylenebis(3,1-benzoxazin-4-one), 2,2'-(4,4'-diphenylene)bis(3,1-benzoxazin-4-one), 2,2'-(2,6-naphthalene)bis(3,1-benzoxazin-4-one), 2,2'-(1,5-naphthalene)bis(3,1-benzoxazin-4-one), 2,2'-(2-methyl-p-phenylene)bis(3,1-benzoxazin-4-one), 2,2'-(2-nitro-p-phenylene)bis(3,1-benzoxazin-4-one) and 2,2'-(2-chloro-p-phenylene)bis(3,1-benzoxazin-4-one). In the general formula (I), m is preferably 1. Out of these, 2,2'-p-phenylenebis(3,1-benzoxazin-4-one), 2,2'-(4,4'-diphenylene)bis(3,1-benzoxazin-4-one) and 2,2'-(2,6-naphthalene)bis(3,1-benzoxazin-4-one) are preferred. 2,2'-p-phenylenebis(3,1-benzoxazin-4-one) of the general formula (I) in which Ar is a 1,4-phenylene group (p-phenylene group) and m is 1 is particularly preferred, and this compound is commercially available from Takemoto Oil & Fat Co., Ltd. under the trade name of CEi-P and from CYTEC INDUSTRIES INC. under the trade name of CYASORB UV-3638.

The cyclic imino ester can be produced by various methods disclosed in WO03/035735 pamphlet. That is, both methods of using an isatoic anhydride (especially the method of using a recrystallized isatoic anhydride) and using an anthranilic acid as a raw material can be used. The cyclic imino ester can be synthesized by the reaction of the acid compound and a carboxylic acid chloride compound. After synthesizing it, it may be recrystallized as indicated in U.S. Pat. No. 4,446,262.

<Component C>

The component C used in the present invention is a fatty acid ester compound which is an ester of a polyhydric alcohol and an aliphatic carboxylic acid and has a molecular weight of 500 to 2,000 g/mol. Owing to this specific fatty acid ester, the polycarbonate resin composition of the present invention has excellent transparency and releasability and suppresses the production of a deposit on a metal mold. The molecular weight of the fatty acid ester compound is preferably 600 to 1,800 g/mol, more preferably 700 to 1,500 g/mol. As the molecular weight decreases, the transparency and releasability of a molded article become higher. This is because the compatibility with the polycarbonate resin of the fatty acid ester compound tends to improve and surface transferability during moldability becomes high. On the other hand, as the molecular weight increases, the volatility of the fatty acid ester compound itself becomes lower and accordingly a deposit is more rarely produced on a metal mold. The above molecular weight range is excellent in terms of transparency and releasability as well as the production of a deposit on a metal mold. These characteristic properties are effective at the above preferred range. The fatty acid ester compounds may be used as a mixture of two or more. In the case of a mixture, the above molecular weight is the number average molecular weight of the mixture.

The component C in the present invention may contain a small amount of a component having a number average molecular weight outside of the above range as far as its number average molecular weight falls within the above range. The amount of the component having a number average molecular weight outside the above range is preferably 40 mol % or less, more preferably 35 mol % or less, much more preferably 30 mol % or less based on 100 mol % of the component C. When the low-molecular weight component having a number average molecular weight outside the above range is contained in a small amount, the releasability of the obtained resin composition is further improved. The preferred component C contains the low-molecular weight component in an amount of preferably 5 mol % or more, more preferably 10 mol % or more based on 100 mol % of the component C.

The polyhydric alcohol used in the component C is preferably an aliphatic polyhydric alcohol having a valence of 4 to 8 (hydroxyl groups) and 5 to 30 carbon atoms. The valence of the aliphatic polyhydric alcohol is preferably 4 to 6, and the number of carbon atoms is preferably 5 to 12, more preferably 5 to 10. The aliphatic polyhydric alcohol may contain an ether bond in the carbon chain. Examples of the aliphatic polyhydric alcohol include pentaerythritol, dipentaerythritol, tripentaerythritol, polyglycerol (triglycerol to hexaglycerol), ditrimethylolpropane, xylytol, sorbitol and mannitol. Out of these, pentaerythritol and dipentaerythritol are preferred, and pentaerythritol is particularly preferred.

The aliphatic carboxylic acid used in the component C preferably has 10 to 22 carbon atoms. Examples of the aliphatic carboxylic acid include saturated aliphatic carboxylic acids such as decanoic acid, undecanoic acid, dodecanoic acid, tridecanoic acid, tetradecanoic acid, pentadecanoic acid, hexadecanoic acid (palmitic acid), heptadecanoic acid, octadecanoic acid (stearic acid), nonadecanoic acid, icosanoic acid and docosanoic acid; and unsaturated aliphatic carboxylic acids such as palmitoleic acid, oleic acid, linoleic acid, linolenic acid, eicosenoic acid, eicosapentaenoic acid and cetoleic acid. Out of these, aliphatic carboxylic acids having 14 to 20 carbon atoms are preferred. Saturated aliphatic carboxylic acids are more preferred. Stearic acid and palmitic acid are particularly preferred.

Aliphatic carboxylic acids such as stearic acid and palmitic acid are generally produced from natural fats and oils such as animal fats and oils (e.g., beef tallow and lard) and vegetable fats and oils (e.g., palm oil). Therefore, aliphatic carboxylic acids such as stearic acid are a mixture containing other carboxylic acid component having a different number of carbon atoms. Stearic acid or palmitic acid which is in the form of a mixture containing other carboxylic acid component and is produced from the above natural fats and oils is preferably used in the production of the component C of the present invention. The preferred content of each component in the mixture is as follows.

Preferably, the aliphatic carboxylic acid constituting the component C contains both a palmitic acid component and a stearic acid component in such a ratio that the total of the peak area (Sp) measured by the thermal decomposition methylation GC/MS (gas chromatography-mass spectrometry) method of the palmitic acid component and the peak area (Ss) of the stearic acid component is 80% or more of the total of all the aliphatic carboxylic acids and the area ratio (Ss/Sp) of the both components is 1.3 to 30.

The thermal decomposition methylation GC/MS method is a method for carrying out GC/MS measurement on a methyl ester derivative of a fatty acid which is formed by decomposing a fatty acid ester through a reaction between the fatty acid ester as a sample and methylammonium hydroxide as a reaction reagent on pyrofoil.

The total of Sp and Ss is preferably 85% or more, more preferably 90% or more, much more preferably 91% or more based on the total of all the aliphatic carboxylic acid components. The total of Sp and Ss can be 100% but preferably 98% or less, more preferably 96% or less from the viewpoint of production cost. The above area ratio (Ss/Sp) is preferably 1.3 to 30. The upper limit of the above range is preferably 10, more preferably 4, much more preferably 3. The above mixing ratio does not need to be obtained with the aliphatic carboxylic acid alone but may be obtained with a mixture of two or more aliphatic carboxylic acids.

Examples of the fat or oil which is the raw material of the aliphatic carboxylic acid and satisfies the above mixing ratio include animal fats and oils such as beef tallow and lard, and vegetable fats and oils such as linseed oil, safflower oil, sunflower oil, soybean oil, corn oil, peanut oil, cotton seed oil, sesame oil and olive oil. Out of these, animal fats and oils containing a large amount of stearic acid are preferred, and beef tallow is more preferred. Further, out of beef tallow, oleostearin which contains saturated components such as stearic acid and palmitic acid in large quantities is preferred.

The fatty acid ester as the component C in the present invention may be a partial ester or full ester, preferably a full ester. In general, the partial ester tends to have a large hydroxyl value, whereby its heat stability is reduced and its reactivity with a polycarbonate resin is increased, thereby reducing the heat stability of the resin composition. Since the molecular weight of the ester itself is apt to become low, the partial ester is disadvantageous in terms of volatility. The full ester in the present invention does not need to have an esterification rate of 100% and may have an esterification rate of 80% or more, preferably 85% or more. The full ester reduces frictional force between resins in the inside of a resin and realizes a smooth flow of the resin with the result that it can reduce the internal strain of a molded article.

The production process of the above specific fatty acid ester is not particularly limited and may be a conventionally known process in which an alcohol is reacted with an aliphatic carboxylic acid. To satisfy the specific conditions of the present invention, it is more preferred that a reaction should be terminated in a relatively early stage when the above apparent esterification reaction ends rather than the reaction should be completed over a sufficiently long time for the production of the full ester. The reaction catalyst is selected from sodium hydroxide, potassium hydroxide, barium hydroxide, calcium hydroxide, calcium oxide, barium oxide, magnesium oxide, zinc oxide, sodium carbonate, potassium carbonate and organic tin compound such as 2-ethylhexyltin.

Further, the component C in the present invention is more preferably a fatty acid full ester having an acid value of 4 to 20 (component C'). By blending a fatty acid full ester having the above acid value, higher releasability is obtained. The acid value is preferably 4 to 18, more preferably 5 to 15. The internal strain of a molded article can also be reduced. When the acid value is smaller than 4, releasability may become unsatisfactory and when the acid value is larger than 20, heat stability may become unsatisfactory. The main component which exhibits the above acid value is a free aliphatic carboxylic acid (may be simply referred to as "free fatty acid" hereinafter) contained in the fatty acid ester. Therefore, the fatty acid ester which is the component C used in the present invention contains an acid component such as a free fatty acid in an amount corresponding to its acid value. The acid value is mg of potassium hydroxide required for neutralizing an acid component such as a free fatty acid contained in 1 g of a sample and can be obtained by the method specified in JIS K 0070.

The reason why the fatty acid full ester having the above specific acid value can reduce release force (improve releasability) is unknown but considered as follows. An object to be measured by acid value is mainly a free fatty acid which is gasified during molding due to its molecular weight and segregated on the surface of a molded article as described above, thereby contributing to the improvement of releasability. Although a certain amount of a volatile component rises as a matter of course, it is relatively small in quantity and rarely remains on a metal mold at the time of release. Therefore, it is considered that the amount of a deposit produced on a metal mold does not increase.

The fatty acid ester as the component C in the present invention refers not only to an ester compound itself but also to a mixture of the compound and a free aliphatic carboxylic acid compound. Further, a fatty acid ester having a target acid value can be prepared by adding an aliphatic carboxylic acid to a fatty acid ester having a small acid value, making use of the fact that the acid value are changed by the proportion of the free aliphatic carboxylic acid. Similarly, a fatty acid ester which satisfies the conditions of the present invention can be prepared by mixing two or more fatty acid esters which differ from each other in acid value.

The hydroxyl value of the component C is preferably small from the viewpoints of heat stability and the reduction of release force. However, when the hydroxyl value is too small, the production time of the component C becomes long, thereby boosting production cost disadvantageously. The hydroxyl value of the component C is suitably 0.1 to 30, preferably 1 to 30, more preferably 2 to 20. The hydroxyl value is mg of potassium hydroxide required for neutralizing acetic acid bonded to a hydroxyl group when 1 g of a sample is acetylated and obtained by the method specified in JIS K 0070.

The iodine value of the component C in the present invention is preferably small from the viewpoint of heat stability. The iodine value of the component C is preferably 10 or less, more preferably 1 or less. The iodine value is the amount of the bonded halogen in terms of g of iodine when halogen is reacted with 100 g of a sample and obtained by the method specified in JIS K 0070.

When the aliphatic carboxylic acid used to form the fatty acid ester is a mixture of components which differ in the numbers of carbon atoms, the molecular weight of the fatty acid ester can be calculated as the molecular weight of a fatty acid ester comprising an aliphatic carboxylic acid based on an average number of carbon atoms of the mixture (for example, the average value of a number "n" when a saturated aliphatic carboxylic acid component is represented by $C_nH_{2n+1}COO(H)$). The average number of carbon atoms can be calculated by $^1$H-NMR measurement. The above value can be calculated, for example, from a ratio of the area of a peak derived from the hydrogen atom of a terminal methyl group to the area of a peak derived from the hydrogen atom of a methylene group at an intermediate position.

The ratio of the free acid compound to the ester compound in the aliphatic carboxylic acid component (including both the free acid compound and the ester compound) can also be calculated by $^1$H-NMR measurement. Therefore, when the ester compound contains a relatively large amount of a free aliphatic carboxylic acid and has a large acid value, the molecular weight of the fatty acid ester is calculated by taking into consideration the ratio as well (it is presumed that the average chain length of the aliphatic carboxylic acid component is the same as the free acid compound and the ester compound, and this presumption is considered to be fully reasonable).

The ratio of the free acid compound to the ester compound can be calculated, for example, from the peak area of the hydrogen atom of a methylene group bonded to the carboxyl group of the aliphatic carboxylic acid component to the peak area of the hydrogen atom of a methylene group contained in the alcohol component bonded to an ester bond by $^1$H-NMR measurement.

More specifically, the molecular weight of the fatty acid ester is calculated as follows.

(i) calculation of average chain length of fatty acid component.

A mixture of fatty acids having different chain lengths, that is, alkyl groups with different numbers of carbon atoms is generally used as a raw material of the fatty acid ester. Therefore, it is necessary to reflect the influence of the distribution of the alkyl groups on the molecular weight of the fatty acid ester. To this end, the average chain length of the fatty acids is calculated. $^1$H-NMR measurement using an NMR measurement instrument having a measurement frequency of 400 MHz or higher is used to calculate the average chain length. More specifically, it is calculated from the ratio of the peak area of the hydrogen atom of a methyl group (—$CH_3$ group) at the terminal of an alkyl group to the peak area of the hydrogen atom of a methylene bond (—$CH_2$— bond) contained in the alkyl group. It is assumed that the average chain length of the ester component of the fatty acid ester is the same as that of the free fatty acid of the ester compound. This assumption is fully reasonable in consideration of the production method.

(ii) calculation of the number of mols (P) of ester component and the number of mols (Q) of free fatty acid in fatty acid ester.

Since the fatty acid ester contains the free fatty acid to no small extent, it is necessary to reflect the influence of the ratio of the fatty acid ester component to the free fatty acid in the fatty acid ester on the molecular weight of the fatty acid ester.

(ii-1) calculation of the ratio (Ff/Fe) of free fatty acid to fatty acid component bonded to ester bond.

To calculate the above P and Q, the ratio (Ff/Fe) of the free fatty acid to the fatty acid component bonded to an ester bond must be first obtained. To this end, the $^1$H-NMR measurement of the fatty acid ester is carried out by using an NMR measurement instrument having a measurement frequency of 400 MHz or higher. Specifically, the peak area of the hydrogen atom of a hydrocarbon bond (i.e., methylene bond)bonded to the carboxyl group (including both carboxyl groups of the free acid and the fatty acid component bonded to the ester bond) of the fatty acid is calculated. This peak area proportionates to the total amount of all the fatty acid components. Meanwhile, the peak area of the hydrogen atom of a hydrocarbon bond bonded to an ester bond in the alcohol component of a fatty acid ester is calculated. This peak area proportionates to the total amount of all the ester bonds. Therefore, the above Ff/Fe (=y) can be calculated from these peak areas.

More specifically, when the fatty acid ester is an ester of pentaerythritol, Ff/Fe is calculated as follows. The signal of the hydrogen atom of a methylene group bonded to the carboxyl group of the fatty acid appears at about 2.3 ppm. The peak area of this region is represented by Sc. Meanwhile, the signal of the hydrogen atom of a methylene group in a pentaerythritol component bonded to an ester bond appears at about 4.1 ppm. The peak area of this region is represented by Se. Thereby, Ff/Fe (=y) is calculated from the relationship $$Ff/Fe = y = (Sc/2 - Se/2)/(Se/2).$$

(ii-2) calculation of the number of mols (P) of ester component and the number of mols (Q) of free acid.

The number of mols of the fatty acid component bonded to the ester bond contained in 1 mol of the fatty acid ester is represented by $\alpha$. The number of mols of the hydroxyl group (—OH group) contained in 1 mol of the fatty acid ester is represented by x. The valence of the alcohol component of the fatty acid ester is represented by v. The number of mols of the ester component which is a net ester compound contained in 1 mol of the fatty acid ester is represented by $(\alpha-x)/v$. When the sum of (P+Q) is 1, P represents the number of mols of the ester component contained in 1 mol of the fatty acid ester. Therefore, $P=(\alpha+x)/v$. Meanwhile, $Q=y\times\alpha=1-P$. Therefore, P and Q can be obtained by determining $\alpha$ and x.

(iii) calculation of molecular weight of fatty acid ester.

(iii-1) calculation of $\alpha$.

$\alpha$ which represents the number of mols of the fatty acid component bonded to the ester bond contained in 1 mol of the fatty acid ester satisfies the expression $\alpha=(v-x)/(1+v\times y)$ from the relationship between P and Q. Therefore, $\alpha$ can be obtained by determining x.

(iii-2) calculation of contribution Me of ester component to the molecular weight of fatty acid ester.

In 1 mol of the fatty acid ester, $\alpha$ mols of the fatty acid component bonded to the ester bond, $P (=(\alpha+x)/v)$ mols of the alcohol component in the fatty acid ester and x mols of the hydrogen atom of the OH group are bonded to form an ester component. Therefore, the contribution Me of the ester component to the molecular weight of the fatty acid ester is represented by $Me=(\alpha\times ms)+(P\times mt)+(x\times 1)$. ms represents the molecular weight of the fatty acid component and mt represents the molecular weight of the alcohol component of the fatty acid ester. ms can be calculated from the average chain length of the fatty acid component. x must be determined for the calculation of Me.

(iii-3) calculation of contribution Mf of free fatty acid to the molecular weight of fatty acid ester.

Mf is represented by $Mf=mu\times Q$ when the molecular weight of the free fatty acid is represented by mu. mu can be calculated from the average chain length of the fatty acid component.

(iii-4) calculation of molecular weight (M) of fatty acid ester.

The molecular weight of the fatty acid ester is calculated from $M=Me+Mf$. However, to calculate Me and Mf as described above, x must be determined. The number of mols x of the hydroxyl group (—OH group) contained in 1 mol of the fatty acid ester can be calculated from the hydroxyl value of the fatty acid ester. However, to calculate x from the hydroxyl value, the value of molecular weight M is necessary and x is the function of M. By introducing x into the expression M=Me+Mf, M can be obtained. M can be easily calculated as follows. That is, x is assumed to calculate the provisional molecular weight (M'). Then, x' which is the provisional x is calculated from the molecular weight M' and the hydroxyl value. When x is the same as x' in value, it is true x and the molecular weight M is calculated from true x.

The molecular weight of the fatty acid ester of the present invention can be calculated by the method detailed above.

<Composition>

The polycarbonate resin composition of the present invention comprises 100 parts by weight of the component A, 0.01 to 10 parts by weight of the component B and 0.01 to 1 part by weight of the component C. The polycarbonate resin composition of the present invention can be produced by mixing together the components A, B and C. The amount of the component B is preferably 0.05 to 3.5 parts by weight, more preferably 0.01 to 1 part by weight based on 100 parts by weight of the component A. When the amount of the component B is smaller than 0.01 part by weight, ultraviolet light absorptivity degrades and satisfactory resistance to ultraviolet radiation cannot be obtained. When the amount of the component B is larger than 10 parts by weight based on 100 parts by weight of the component A, the heat stability of the obtained composition deteriorates or the component B hardly dissolves in the polycarbonate resin, thereby exerting a bad influence upon the production of a deposit on a metal mold. The amount of the component C is preferably 0.02 to 0.5 part by weight, more preferably 0.05 to 0.25 part by weight based on 100 parts by weight of the component A. When the amount of the fatty acid ester as the component C falls below the above range, the improvement of releasability becomes unsatisfactory. When the amount of the fatty acid ester as the component C exceeds the above range, the transparency of the obtained molded article is impaired and the heat stability of the resin composition may deteriorate during molding.

<Other Ultraviolet Light Absorber>

The polycarbonate resin composition of the present invention may contain other ultraviolet light absorber in limits that do not impair the object of the present invention. The component B of the present invention may be slightly inferior to other ultraviolet light absorber in the initial ultraviolet light protection efficiency of a molded article of the polycarbonate resin composition. Since the component B is hardly decomposed or vaporized by exposure to ultraviolet radiation, it is advantageous in long-term resistance to ultraviolet radiation. Therefore, a combination of the component B of the present invention and other ultraviolet light absorber can compensate for their deficiencies.

The ultraviolet light absorber is, for example, a known benzophenone-based compound, benzotriazole-based compound or hydroxyphenyltriazine-based compound. Specific preferred examples of the ultraviolet light absorber include 2-(2H-benzotriazol-2-yl)-4-(1,1,3,3-tetramethylbutyl)phenol (commercially available products thereof include CYASORB UV-5411 of CYTEC INDUSTORIES INC.), 2-(2H-benzotriazol-2-yl)-4,6-bis(1-methyl-1-phenylethyl)phenol (commercially available products thereof include TINUVIN234 of Ciba Specialty Chemicals K.K.), 2,2'-methylenebis[6-(2H-benzotriazol-2-yl)-4-(1,1,3,3-tetramethylbutyl)phenol] (commercially available products thereof include ADEKASTAB LA-31 of Asahi Denka Kogyo K.K.), and 2-(4,6-diphenyl-1,3,5-triazin-2-yl)-5-[(hexyl)oxy]phenol (commercially available products thereof include TINUVIN1577FF of Ciba Specialty Chemicals K.K.).

The amount of the ultraviolet light absorber other than the component B is preferably 0. 2 part or less by weight, more preferably 0.1 part or less by weight based on 100 parts by weight of the component A. The lower limit is 0.01 part by weight, more preferably 0.05 part by weight when other ultraviolet light absorber is used.

<Other Additives>

The polycarbonate resin composition of the present invention may contain various additives which are generally mixed with a polycarbonate resin, besides the above components A to C and other ultraviolet light absorber.

(i) Phosphorus-based stabilizer

A phosphorus-based stabilizer is preferably blended in order to mainly improve the heat stability during molding of the resin composition of the present invention. The phosphorus-based stabilizer is a phosphrus acid, phosphoric acid, phosphonous acid, phosphonic acid or ester thereof. Besides the phosphorus-based stabilizer includes a tertially phosphine.

Specific examples of the phosphite compound include triphenyl phosphite, tris(nonylphenyl)phosphite, tridecyl phosphite, trioctyl phosphite, trioctadecyl. phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, 2,2-methylenebis(4,6-di-tert-butylphenyl)octyl phosphite, tris(diethylphenyl)phosphite, tris(di-iso-propylphenyl)phosphite, tris(di-n-butylphenyl)phosphite, tris (2,4-di-tert-butylphenyl)phosphite, tris(2,6-di-tert-butylphenyl)phosphite, distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl) pentaerythritol diphosphite, phenyl bisphenol A pentaerythritol diphosphite, bis(nonylphenyl)pentaerythritol diphosphite and dicyclohexyl pentaerythritol diphosphite.

Other phosphite compounds which react with a diphenol and has a cyclic structure may be used. The phosphite compounds include 2,2-methylenebis(4,6-di-tert-butylphenyl)(2,4-di-tert-butylphenyl)phosphite, 2,2'-methylenebis(4, 6-di-tert-butylphenyl)(2-tert-butyl-4-methylphenyl)phosphite, 2,2'-methylenebis(4-methyl-6-tert-butylphenyl)(2-tert-butyl-4-methylphenyl)phosphite and 2,2'-ethylidenebis (4-methyl-6-tert-butylphenyl)(2-tert-butyl-4-methylphenyl) phosphite.

Examples of the phosphate compound include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Out of these, triphenyl phosphate and trimethyl phosphate are preferred.

Examples of the phosphonite compound include tetrakis (2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite. Out of these, tetrakis(di-tert-butylphenyl)-biphenylene diphosphonites and bis (di-tert-butylphenyl)-phenyl-phenyl phosphonites are preferred, and tetrakis(2,4-di-tert-butylphenyl)-biphenylene diphosphonites and bis(2,4-di-tert-butylphenyl)-phenyl-phenyl phosphonites are more preferred. The phosphonite compound may be and is preferably used in combination with the above phosphite compound having aryl groups substituted for two or more of alkyl groups.

Examples of the phosphonate compound include dimethylbenzene phosphonate, diethylbenzene phosphonate and dipropylbenzene phosphonate.

Examples of the tertially phosphine compound include triethylphosphine, tripropylphosphine, tributylphosphine, trioctylphosphine, triamylphosphine, dimethylphenylphosphine, dibutylphenylphosphine, diphenylmethylphosphine, diphenyloctylphosphine, triphenylphosphine, tri(p-tolyl) phosphine, trinaphtylphosphine and diphenylbenzylphosphine. Out of these, triphenylphophine is preferred.

The above phosphorus-based stabilizers may be used alone or in combination of two or more. Out of the above phosphorus-based stabilizers, phosphate compounds and phosphonite compounds are preferred. Particularly preferred are tris(2,4-di-tert-butylphenyl)phosphite, tetrakis(2,4-di-tert-butylphenyl)-4,4'-biphenylene diphosphonite and bis(2,4-di-tert-butylphenyl)-phenyl-phenyl phosphonites. It is also preferred to use them in combination with a phosphate compound.

(ii) hindered phenol-based stabilizer

A hindered phenol-based stabilizer may be further blended to mainly improve the heat stability during molding, resistance to heat aging and resistance to ultraviolet radiation of the polycarbonate resin composition of the present invention. Examples of the hindered phenol-based stabilizer include α-tocopherol, butylhydroxytoluene, sinapyl alcohol, vitamin E, n-octadecyl-β-(4'-hydroxy-3',5'-di-tert-butylphenyl)propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidene-bis(3-methyl-6-tert-butylphenol), triethylene glycol-N-bis-3-(3-tert-butyl-4-hydroxy-5-methylphenyl)propionate, 1,6-hexanediol-bis[3-(3,5-di-tert-butyl-4-hydroxyphenyl)propionate], bis[2-tert-butyl-4-methyl-6-(3-tert-butyl-5-methyl-2-hydroxybenzyl)phenyl]terephthalate, 3,9-bis{2-[3-(3-tert-butyl-4-hydroxy-5-methylphenyl)propionyloxy]-1,1-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2-thiodiethylenebis-[3-(3,5-di-tert-butyl-4-hydroxyphenyl) propionate], 2,4-bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tris(3,5-di-tert-butyl-4-hydroxyphenyl) isocyanurate, tris(3,5-di-tert-butyl-4-hydroxybenzyl) isocyanurate, 1,3,5-tris(4-tert-butyl-3-hydroxy-2,6-dimethylbenzyl)isocyanurate, 1,3,5-tris-2-[3-(3,5-di-tert-butyl-4-hydroxyphenyl)propionyloxy]ethyl isocyanurate and tetrakis[methylene-3-(3',5'-di-tert-butyl-4-hydroxyphenyl)propionate]methane. All of them are easily acquired. The above hindered phenol-based antioxidants may be used alone or in combination of two or more.

The amounts of the above phosphorus-based stabilizer (i) and the hindered phenol-based antioxidant (ii) are each 0.0001 to 1 part by weight, preferably 0.001 to 0.1 part by weight, more preferably 0.005 to 0.1 part by weight based on 100 parts by weight of the polycarbonate resin (component A). When the amount of the stabilizer falls below the above range, it is difficult to obtain a good stabilization effect and when the amount exceeds the above range, the characteristic properties of the composition may deteriorate.

An antioxidant other than the above hindered phenol-based antioxidants may be used to further stabilize the color during a heat treatment of a molded article of the polycarbonate resin composition of the present invention. Examples of the antioxidant include a lactone-based stabilizer and a sulfur-based stabilizer. The lactone-based stabilizer is generally known and disclosed in detail in U.S. Pat. No. 6,310,220. The preferred lactone-based stabilizer comprises 3-(3,4-dimethylphenyl)-5,7-(di-tert-butyl)-benzofran-2-one as the main component. The stabilizer is available under the trade name HP-136 of Ciba Specailty Chemicals Inc. The sulfur-based stabilizers include pentaerythritol tetrakis(3-mercaptopropionate), pentaerythritol tetrakis(3-laurylthiopropionate) and glycerol-3-stearyl thiopropionate. The amount of the above antioxidant is preferably 0.001 to 0.05 part by weight based on 100 parts by weight of the polycarbonate resin as the component A. Further, the polycarbonate resin composition of the present invention may contain a hindered amine-based optical stabilizer. The optical stabilizer exhibits excellent performance in terms of resistance to ultraviolet radiation when it is used in combination with the above ultraviolet light absorber and antioxidant.

(iii) bluing agent

Preferably, the polycarbonate resin composition of the present invention further contains a bluing agent in an amount of 0.05 to 3.0 ppm (in terms of weight). To further reduce the yellow tint of the resin composition of the present invention and provide natural transparency to a molded article thereof, use of a bluing agent is extremely effective. The bluing agent is a colorant which absorbs orange or yellow rays to assume a blue or violet color and particularly preferably a dye. The polycarbonate resin composition of the present invention obtains a more excellent color when it is blended with a bluing agent. When the amount of the bluing agent is smaller than 0.05 ppm, its effect of improving color may become unsatisfactory and when the amount is larger than 3.0 ppm, light transmittance lowers disadvantageously. The amount of the bluing agent is preferably 0.2 to 2.0 ppm. Typical examples of the bluing agent include the Macrolex Violet B and Macrolex Blue RR of Bayer AG. and the Polysynthren Blue RLS of Clariant.

(iv) fluorescent dye

Since the polycarbonate resin composition of the present invention has excellent transparency, when it further contains a fluorescent brightener, higher light transmittance and natural transparency are obtained, and when it contains a fluorescent brightener and a fluorescent dye which emits light other than the light of the fluorescent brightener, a design effect making use of a luminescent color can be obtained.

Examples of the fluorescent dye (including fluorescent brightener) used in the present invention include coumarin-based fluorescent dyes, benzopyran-based fluorescent dye, perylene-based fluorescent dyes, anthraquinone-based fluorescent dyes, thioindigo-based fluorescent dyes, xanthene-based fluorescent dyes, xanthone-based fluorescent dyes, thioxanthene-based fluorescent dyes, thioxanthone-based fluorescent dyes, thiazine-based fluorescent dyes and diaminostilbene-based fluorescent dyes. Out of these, coumarin-based fluorescent dyes, benzopyran-based fluorescent dyes and perylene-based fluorescent dyes are preferred because they have high heat resistance and rarely deteriorate during the molding of the polycarbonate resin. Coumarin-based fluorescent dyes, namely, fluorescent dyes made from coumarin derivatives are particularly preferred because they retain excellent characteristic properties even when they are used in combination with the component B of the present invention.

The fluorescent dyes made from coumarin derivatives are preferably fluorescent brighteners represented by the following formula (III):

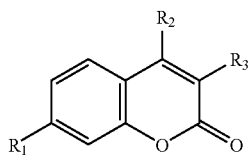

(III)

wherein $R_1$ is an amino group, alkyl group-substituted amino group, hydroxyl group or substituent of any one of the following formulas (III-i), (III-ii) and (III-iii), $R_2$ is a hydrogen atom or fluoroalkyl group, and $R_3$ is a hydrogen atom, alkyl group or aryl group.

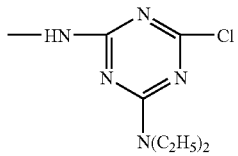

(III-i)

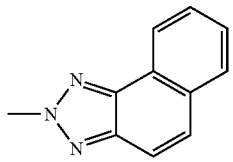

(III-ii)

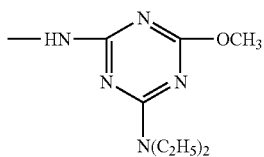

(III-iii)

Out of the above formulas (III), $R_1$ is preferably a substituent of the formula (III-ii). Coumarin derivatives represented by the following formulas (IV) and (V) are preferred, and coumarin derivatives represented by the formula (V) are particularly preferred. The coumarin derivatives may be used alone or in combination of two or more.

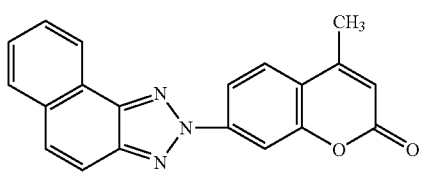

(IV)

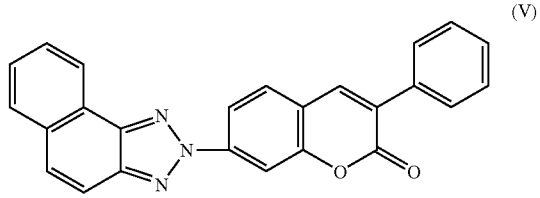

(V)

The amount of the above fluorescent dye (iv) (including fluorescent brightener) is 0.0001 to 3 parts by weight, preferably 0.0005 to 1 part by weight, more preferably 0.0005 to 0.5 part by weight, much more preferably 0.001 to 0.5 part by weight, particularly preferably 0.001 to 0.1 part by weight based on 100 parts by weight of the polycarbonate resin (component A). Within the above range, excellent resistance to ultraviolet radiation and color are obtained together with high heat stability and light transmittance.

(v) light diffuser and high reflection white pigment

Since the polycarbonate resin composition of the present invention has excellent transparency, color and light resistance, the light diffusion function of a light diffuser and the high light reflection function of a white pigment are obtained more effectively. Therefore, the aromatic polycarbonate resin of the present invention provides a resin composition having more excellent characteristic properties when it is mixed with a light diffuser and a white pigment. Examples of the light diffuser include polymer fine particles (preferably acrylic crosslinked particles and silicone crosslinked particles having a diameter of several micrometers), inorganic fine particles having a low refractive index and composites thereof. The amount of the light diffuser is 0.005 to 20 parts by weight, preferably 0.01 to 10 parts by weight based on 100 parts by weight of the component A. The white pigment is particularly preferably a titanium dioxide pigment (especially titanium dioxide treated with an organic surface treating agent such as silicone), and the amount thereof is 1 to 30 parts by weight, preferably 2 to 20 parts by weight based on 100 parts by weight of the component A.

(vi) antistatic agent

Antistatic properties may be required for the polycarbonate resin composition of the present invention. In this case, the polycarbonate resin composition preferably contains an antistatic agent. An example of the antistatic agent is (i) an organic sulfonic acid phosphonium salt such as an arylsulfonic acid phosphonium salt typified by dodecylbenzenephosphonium sulfonate, or alkylsulfonic acid phosphonium salt, or boric acid phosphonium salt typified by tetrafluoroboric acid phosphonium salt. The amount of the phosphonium salt is suitably 5 parts or less by weight, preferably 0.05 to 5 parts by weight, more preferably 1 to 3.5 parts by weight, much more preferably 1.5 to 3 parts by weight based on 100 parts by weight of the component A.

Another example of the antistatic agent is (ii) an organic sulfonic acid alkali (earth) metal salt such as organic lithium sulfonate, organic sodium sulfonate, organic potassium sulfonate, organic cesium sulfonate, organic rubidium sulfonate, organic calcium sulfonate, organic magnesium sulfonate or organic barium sulfonate. Specific examples of the organic sulfonic acid alkali (earth) metal salt include metal salts of dodecylbenzenesulfonic acid and metal salts of perfluoroalkanesulfonic acid. The amount of the organic sulfonic acid alkali (earth) metal salt is suitably 0.5 part or less by weight, preferably 0.001 to 0.3 part by weight, more preferably 0.005 to 0.2 part by weight based on 100 parts by weight of the component A. Alkali metal salts such as potassium, cesium and rubidium salts are particularly preferred.

Still another example of the antistatic agent is (iii) an organic sulfonic acid ammonium salt such as alkylsulfonic acid ammonium salt or arylsulfonic acid ammonium salt. The amount of the ammonium salt is suitably 0.05 part or less by weight based on 100 parts by weight of the component A. A further examples of the antistatic agent is (iv) a polymer containing a poly(oxyalkylene)glycol component such as polyether ester amide as a constituent component. The amount of the polymer is suitably 5 parts or less by weight based on 100 parts by weight of the component A. A still further example of the antistatic agent is (v) a non-organic compound such as carbon black, carbon fiber, carbon nano-tube, graphite, metal powder or metal oxide powder. The amount of the non-organic compound is suitably 0.05 part or less by weight based on 100 parts by weight of the component A.

(vii) compound having heat ray absorptivity

The polycarbonate resin composition of the present invention may contain a compound having heat ray absorptivity in limits that do not impair the object of the present invention. Preferred examples of the compound include metal compounds having excellent near infrared light absorptivity such as phthalocyanine-based near infrared light absorbers, metal oxide-based near infrared light absorbers including ATO, ITO, iridium oxide and ruthenium oxide, and metal boride-based near infrared light absorbers including lanthanum boride, cerium boride and tungsten boride; and carbon fillers. The phthalocyanine-based near infrared light absorbers include commercially available MIR-362 of Mitsui Chemicals Inc. The carbon fillers include carbon black, graphite (both natural and artificial, also including whiskers), carbon fibers (including those manufactured by the vapor-phase growth method), carbon nano-tubes and fullerene. Out of these, carbon black and graphite are preferred. They may be used alone or in combination of two or more. The phthalocyanine-based near infrared light absorber is used in an amount of preferably 0.0005 to 0.2 part by weight, more preferably 0.0008 to 0.1 part by weight, much more preferably 0.001 to 0.07 part by weight based on 100 parts by weight of the polycarbonate resin (component A). The amounts of the metal oxide-based near infrared light absorber, metal boride-based near infrared light absorber and carbon filler are each preferably 0.1 to 200 ppm (in terms of weight), more preferably 0.5 to 100 ppm based on the resin composition of the present invention.

(viii) other dye or pigment

The polycarbonate resin composition of the present invention may contain a dye or pigment other than the above bluing agent and fluorescent dye in limits that exhibit the effect of the present invention. A dye is particularly preferred because it does not impair transparency. When a dye providing a deep color and a metallic pigment are used in combination, an excellent metallic color can be obtained.

Examples of the dye include perylene-based dyes, coumarin-based dyes, thioindigo-based dyes, anthraquinone-based dyes, thioxanthone-based dyes, ferrocyanides such as Prussian blue, perinone-based dyes, quinoline-based dyes, quinocridone-based dyes, dioxazine-based dyes, isoindolinone-based dyes and phthalocyanine-based dyes. The amount of the above dye is preferably 0.0001 to 1 part by weight, more preferably 0.0005 to 0.5 part by weight based on 100 parts by weight of the polycarbonate resin as the component A.

The polycarbonate resin composition of the present invention may contain a flame retardant in limits that do not impair the object of the present invention. Examples of the flame retardant include brominated epoxy resin, brominated polystyrene, brominated polycarbonate, brominated polyacrylate, monophosphate compound, phosphate oligomer compound, phosphonate oligomer compound, phosphonitrile oligomer compound, phosphonic acid amide compound, organic acid metal salts other than sulfonic acid salts, and silicone-based flame retardants. They may be used alone or in combination of two or more. The flame retardant can be used in a known amount based on the polycarbonate resin.

The polycarbonate resin composition of the present invention may contain a small amount of other resin or elastomer in limits that do not impair the object of the present invention.

Examples of the other resin include polyester resins such as polyethylene terephthalate and polybutylene terephthalate, polyamide resins, polyimide resins, polyether imide resins, polyurethane resins, silicone resins, polyphenylene ether resins, polyphenylene sulfide resins, polysulfone resins, polyolefin resins such as polyethylene and polypropylene, polystyrene resins, acrylonitrile/styrene copolymer (AS resin), acrylonitrile/butadiene/styrene copolymer (ABS resin), polymethacrylate resins, phenolic resins and epoxy resins.

Examples of the elastomer include isobutylene/isoprene rubber, styrene/butadiene rubber, ethylene/propylene rubber, acrylic elastomers, polyester-based elastomers, polyamide-based elastomers, core-shell type elastomers such as MBS (methyl methacrylate/styrene/butadiene) rubber and MAS (methyl methacrylate/acrylonitrile/styrene) rubber.

The polycarbonate resin composition of the present invention may contain an inorganic filer, fluidity modifier, anti-fungal agent, photocatalyst-based anti-fouling agent and photochromic agent.

<Process for Producing Resin Composition>

The production process of the polycarbonate resin composition of the present invention is not particularly limited. However, the polycarbonate resin composition of the present invention is preferably produced by melt kneading the above components.

The melt kneading means is a Banbury mixer, kneading roll or extruder. Out of these, an extruder is preferred, and a multi-screw extruder such as a twin-screw extruder is more preferred from the viewpoint of kneading efficiency. A preferred example of the twin-screw extruder is as follows. As for the number of threads, single, double or triple threaded screws may be used, and double threaded screws can be preferably used because they have wide ranges of molten resin conveyance capacity and shear kneading capacity. The ratio (L/D) of the length (L) to the diameter (D) of the screw of a twin-screw extruder is preferably 20 to 50, more preferably 28 to 42. When L/D is large, homogeneous dispersion is easily attained and when L/D is too large, the decomposition of the resin is easily caused by heat deterioration. The screw must have at least one, preferably one to three kneading zones, each composed of a kneading disk segment (or kneading segment corresponding to this) in order to improve kneadability.

Further, an extruder having a vent for removing moisture contained in raw materials and a volatilized gas generated from the molten and kneaded resin may be preferably used. A vacuum pump is preferably installed to discharge the moisture or volatilized gas to the outside of the extruder from the vent efficiently. A screen for removing foreign matter contained in the raw materials to be extruded may be installed in a zone before the die of the extruder to eliminate foreign matter from the resin composition. Examples of the screen include a metal net, screen changer and sintered metal plate (disk filter, etc.).

Further, the method of supplying the components B and C and other additives (to be simply referred to as "additives" in the following examples) is not particularly limited. The following methods are typical examples of the method: (i) one in which the additives are supplied into an extruder separately from the polycarbonate resin and (ii) one in which the additives and the polycarbonate resin powder are pre-mixed by a mixer such as a Henschel mixer and supplied into an extruder. One of the methods is to pre-mix all the necessary raw materials together and supply the resulting mixture into the extruder. (iii) The other method is to prepare a master agent which contains the additives in high concentrations and supply the master agent into the extruder independently or after it is pre-mixed with the remaining polycarbonate resin. The master agent may be a powder or granule prepared by compacting and granulating the powder. Pre-mixing means is a Nauter mixer, twin-cylinder mixer, Henschel mixer, mechanochemical device or extrusion mixer. Out of these, a high-speed agitation type mixer such as a Henschel mixer is preferred. Other pre-mixing method is to prepare a solution by uniformly dispersing a polycarbonate resin and additives in a solvent and remove the solvent from the resulting solution.

The resin extruded from a twin-screw extruder is pelletized by directly cutting it or by forming it into a strand and cutting the strand by a pelletizer. When the influence of external dust must be reduced, the atmosphere surrounding the extruder is preferably cleaned.

<Molded Articles of the Resin Composition of the Present Invention>

Various products can be manufactured by injection molding a pellet which is produced from the polycarbonate resin composition of the present invention obtained as described above. Molded articles can be obtained not only by ordinary molding techniques but also by injection molding techniques such as injection compression molding, injection press molding, gas assist injection molding, foam molding (including what comprises the injection of a super-critical fluid), insert molding, in-mold coating molding, heat insulating molding, quick heating and cooling molding, two-color molding, sandwich molding and super high-speed injection molding. The advantages of these molding techniques are already widely known. Both cold-runner molding and hot-runner molding may be employed.

The resin composition of the present invention may be formed into a profile, sheet or film by extrusion molding. Inflation, calendering and casting techniques may be used to form a sheet or film. Further, a specific drawing operation may be used to mold it into a heat shrinkable tube. The polycarbonate resin composition of the present invention can be formed into a molded article by rotational molding or blow molding.

Thereby, there is provided a molded article of the polycarbonate resin composition, which has excellent transparency and releasability, suppresses the production of a deposit on a metal mold, and is excellent in production efficiency and cost performance. That is, according to the present invention, there is provided a molded article obtained by melt molding the polycarbonate resin composition which comprises 100 parts by weight of the component A, 0.01 to 10 parts by weight of the component B and 0.01 to 1 part by weight of the component C.

Further, a molded article of the polycarbonate resin composition of the present invention can be subjected to a surface treatment. The surface treatment is vapor deposition (physical deposition, chemical deposition, etc.), plating (electroplating, electroless plating, melt plating, etc.), painting, coating or printing, all of which are used for an ordinary polycarbonate resin to form anew layer on the surface layer of a resin molded article. Specific examples of the surface treatment include hard coating, water repellent and oil repellent coating, ultraviolet light absorption coating, infrared light absorption coating and metallizing (such as deposition). Hard coating is a particularly preferred and necessary surface treatment.

Since the polycarbonate resin composition of the present invention is excellent in transparency, color, releasability and resistance to ultraviolet radiation, it is advantageously used in transparent members which require high quality. The transparent members include, for example, transparent members for vehicles (head lamp lenses, winker lamp lenses, tail lamp lenses, resin glazing materials, meter covers, etc.), illumination lamp covers, resin window glass (for construction), solar cell covers, solar cell substrates, displaylenses, touch panels, and parts (front covers, circuit covers, chasses and pinball conveyor guides, etc.) for game machines (pinball machines, etc.). Out of these, the polycarbonate resin composition of the present invention is particularly suitable for use in transparent members for vehicles.

That is, according to the present invention, there is provided a molded article of the resin composition comprising the above specific amounts of the components A to C of the present invention, and there is preferably provided a transparent member for vehicles. The transparent member for vehicles is preferably a car lamp lens such as a head lamp lens or cover (plain head lamp lens) or a car glazing material.

The car lamp lens in the present invention must be a transparent member which transmits light from a light source and serves as a car lamp, especially head lamp. The lens may be installed at any position of a vehicle and have any shape. For example, it may be a lens like a rod which transmits light in its longitudinal direction. The car glazing material in the present invention includes, for example, a front door window (wind shield), rear door window, quarter window, back window, back door window, sunroof and roof panel.

As described above, the polycarbonate resin composition of the present invention is useful in fields such as electronic and electric appliances, OA equipment, car parts, mechanical parts, agricultural materials, conveyor containers, game machines and miscellaneous goods. Its industrial effect is exceptional.

EXAMPLES

The following examples are provided to further illustrate the present invention. Evaluations were made by the following methods.

(1) Evaluation of a deposit on a metal mold: 200 plain head lamp lenses shown in FIG. 1 were continuously molded to evaluate the amount of a deposit on a metal mold after molding. Molding was carried out by using the SG26OM-HP of Sumitomo Heavy Industries, Ltd. at a cylinder temperature of 310° C., a mold temperature of 80° C., an injection rate of 50 mm/sec and a molding cycle of 70 sec.

The collection of a deposit was carried out by removing an insert die (corresponding to the convex surface of a molded product) corresponding to the body portion of the molded product, installed on the movable side of the metal mold, from the metal mold after continuous molding, cleaning the surface of the metal mold with methylene chloride to remove the deposit from the surface of the metal mold, and volatilizing methylene chloride from the methylene chloride solution. When the obtained deposit was measured by an NMR measuring instrument, in a sample containing the component C-1 as a parting agent the deposit was essentially composed of an ultraviolet light absorber. In a sample containing the component C-2 as a parting agent the deposit was composed of a mixture of a fatty acid ester and an ultraviolet light absorber. Therefore, the amount of the deposit on the metal mold was calculated by dissolving the above deposit in a predetermined amount of chloroform and measuring the absorbance of an ultraviolet light absorber contained in the chloroform solution with a spectrophotometer (HITACHI SPECTROPHPOTOMETER U-3210 of Hitachi, Ltd.). The weight of the deposit was calculated from the absorbance using a calibration curve between the absorbance and concentration of the ultraviolet light absorber. Only for the sample containing the component C-2 as a parting agent, the weight of the deposit obtained above was calculated by using an electronic balance. The weight calculated by using the electronic balance is shown outside the table.

(2) Measurement of releasability: An ejection load (N) applied to an ejector pin when a cup-like molded product having a diameter of 70 mm, a height of 20 mm and a thickness of 4 mm was molded by an injection molding machine having a maximum clamping force of 735 kN at a cylinder temperature of 300° C., a mold temperature of 80° C. and an injection pressure of 118 MPa was measured to calculate the average value of ejection load for 30 shot molding. The proportion (%) of a release load was calculated from the average value when the release load of Referential Example 1 was 100%.

(3) Transparency (haze): The haze of a molded plate having an arithmetic mean roughness (Ra) of 0.03 μm and a thickness of 2.0 mm was measured by the NDH-300A of Nippon Denshoku K.K. Ltd. in accordance with JIS K7105. As the numerical value of haze becomes larger, the diffusion of light increases, that is, transparency deteriorates.

(4) Color (YI value): The YI value was calculated from X, Y and Z values obtained by measuring light transmitted through the same molded plate as in (3) above with the Z-1001DP color difference meter of Nippon Denshoku K.K. based on the following equation in accordance with ASTM-E1925.

$$YI=[100(1.28X-1.06Z)]/Y$$

(5) Resistance to molding heat: The YI value of a molded plate of the same shape as in (3) above formed from a resin which was retained in the cylinder of a molding machine for 10 minutes was measured in the same manner as in (4) above. The difference obtained by subtracting the YI value of a specimen before residence from the YI value of the specimen after residence and taken as ΔYI.

(6) Resistance to ultraviolet radiation: The same molded plate as in (3) above was treated for 1,000 hours at a cycle time of 120 minutes which consisted of 18 minutes of exposure to a water spray and 102 minutes of non-exposure, a black panel temperature of 63° C. and a humidity of 50%, using a sunshine weather meter (WELSUN HC-B of Suga Test Instruments Co., Ltd.) to obtain a difference ΔYI by subtracting the YI value of the specimen before the treatment from the YI value of the specimen after the treatment.

$$\Delta YI=(YI \text{ after treatment})-(YI \text{ before treatment})$$

(7) Productivity was evaluated from releasability and a deposit on a metal mold based on the following criteria. The poor releasability of Comparative Example 1 made it difficult to carry out continuous molding at a predetermined cycle.

⊚: extremely high

○: satisfactory

Δ: slightly low

X: low

Examples 1 to 7 and Comparative Examples 1 to 6

Additives shown in Tables 1 to 3 in amounts shown in Tables 1 to 3 and 0.00007 part by weight of a bluing agent (Macrolex Violet B of Bayer AG.) were added to 100 parts by weight of a polycarbonate resin powder produced from bisphenol A and phosgene by the interfacial polycondensation process, mixed together by a blender and melt kneaded by a vented twin-screw extruder to obtain a pellet. After a pre-mixture of the polycarbonate resin powder and the additives in concentrations 10 to 100 times predetermined amounts was prepared, it was totally mixed by the blender. The TEX30α (having double threaded screws completely meshed with each other and rotating in the same direction) of Japan Steel Works, Ltd. was used as the vented twin-screw extruder. One kneading zone was situated before the vent port. The extrusion conditions include a delivery rate of 25 kg/h, a screw revolution of 150 rpm, a vent vacuum degree of 3 kPa and an extrusion temperature from the first feed port to the die portion of 280° C.

The obtained pellet was dried by a hot air circulating drier at 120° C. for 5 hours and molded into a smooth and flat plate like specimen having a length of 50 mm, a width of 50 mm, a thickness of 2 mm and an arithmetic average surface roughness (Ra) of 0.03 μm by an injection molding machine at a cylinder temperature of 310° C., a mold temperature of 80° C. and an injection rate of 60 mm/sec. The 80MSP-SC of Mitsubishi Heavy Industries, Ltd. was used as the injection molding machine. The obtained specimen was used for the above evaluations (3), (4) and (6). After measuring process in the injection molding, the cylinder was moved backward and kept in that state for 10 minutes, and molding was carried out again to obtain a specimen for the evaluation of resistance to molding heat (5) above. The evaluation results of the obtained specimen are shown in Tables 1 to 3.

After the obtained pellet was dried in the same manner, plain type head lamp lenses shown in FIG. 1 were continuously molded from the pellet by an injection molding machine (SG260M-HP of Sumitomo Heavy Industries, Ltd.) at a cylinder temperature of 310° C. and a mold temperature of 80° C. The evaluation results of a deposit on a metal mold after molding are shown in Tables 1 to 3. The head lamp lenses formed from the compositions of Examples had a good appearance in terms of color and transparency and fully suppressed the production of a deposit on a metal mold.

Components such as additives in Tables 1 to 3 are given below.

(Component A)

PC: polycarbonate resin powder having a viscosity average molecular weight of 22,400 produced from bisphenol A and phosgene by the interfacial polycondensation process (Panlite L-1225WP of Teijin Chemicals Ltd.)

(Component B)

B-1: 2,2'-p-phenylenebis(3,1-benzoxazin-4-one) (CEi-P of Takemoto Oil & Fat Co., Ltd.)

B-2: 2-(2H-benzotriazol-2-yl)-4-(1,1,3,3-tetramethylbutyl) phenol (Kemisorb 79 of Chemipro Chemicals Co., Ltd.)

B-3: 2,2'-methylenebis[6-(2H-benzotriazol-2-yl)-4-(1,1,3,3-tetramethylbutyl)phenol] (LA-31 of Asahi Denka Kogyo K.K.)

B-4: 2-(4,6-diphenyl-1,3,5-triazin-2-yl)-5-[(hexyl)oxy]phenol (Tinuvin1577 of Ciba Specialty Chemicals K.K.)

<Component C>

C-1: full ester of pentaerythritol and aliphatic carboxylic acid, having a molecular weight of 925 (Rikester EW-400 of Riken Vitamin Co., Ltd.)

The average number of carbon atoms of the fatty acid component of the ester was 17.49 (therefore, the molecular weight of the alkyl group contained in the fatty acid component was 15.49×14+15=231.86). This average number of carbon atoms was calculated by $^1$H-NMR measurement using an NMR measurement instrument having a measurement frequency of 400 MHz (of JEOL Ltd.) (the same shall apply to the following components C). The ratio (Ff/Fe) of the free fatty acid to the fatty acid component bonded to the ester bond was 7.7/92.3 (y=0.0834). This ratio was calculated by $^1$H-NMR measurement using an NMR measurement instrument having a measurement frequency of 600 MHz (of JEOL Ltd.) (the same shall apply to the following components C). The hydroxyl value of the ester was 6.9 mgKOH/g. The molecular weight was calculated from these values by the method specified in this text. The number of mols of the hydroxyl group contained in 1 mol of the fatty acid ester was 0.114, the number of mols (P) of the ester component (that is, alcohol component) contained in 1 mol of the fatty acid ester was 0.76, and the number of mols (Q) of the free fatty acid was 0.24.

C-2: monoester of glycerin and aliphatic carboxylic acid, having a molecular weight of 341 (Rikemal S-100A of Riken Vitamin Co., Ltd.)

The average number of carbon atoms of the fatty acid component of the ester was 16.92 (therefore, the molecular weight of the alkyl group contained in the fatty acid component was 14.92×14+15=223.88). The ratio (Ff/Fe) of the free fatty acid to the fatty acid component bonded to the ester bond was 1/99 (y=0.0101). The hydroxyl value of the ester was 326.7 mgKOH/g. The molecular weight was calculated from these values by the method specified in this text. The number of mols of the hydroxyl group contained in 1 mol of the fatty acid ester was 1.987, the number of mols (P) of the ester component (that is, alcohol component) contained in 1 mol of the fatty acid ester was 0.99, and the number of mols (Q) of the free fatty acid was 0.01.

C-3: full ester of pentaerythritol and aliphatic carboxylic acid, having a molecular weight of 1,061 (Loxiol VPG-861 of Cognis Japan Co., Ltd.)

The average number of carbon atoms of the fatty acid component of the ester was 17.17 (therefore, the molecular weight of the alkyl group contained in the fatty acid component was 15.17×14+15=227.38). The ratio (Ff/Fe) of the free fatty acid to the fatty acid component bonded to the ester bond was 1.1/98.9 (y=0.0111). The hydroxyl value of the ester was 11.9 mgKOH/g. The molecular weight was calculated from these values by the method specified in this text. The number of mols of the hydroxyl group contained in 1 mol of the fatty acid ester was 0.225, the number of mols (P) of the ester component (that is, alcohol component) contained in 1 mol of the fatty acid ester was 0.96, and the number of mols (Q) of the free fatty acid was 0.04.

C-4: glycerin tristearate having a molecular weight of 833 obtained by reacting glycerin (guaranteed reagent of Wako Pure Chemical Industries, Ltd.) with stearic acid (guaranteed reagent of Wako Pure Chemical Industries, Ltd.) in accordance with a commonly used method The average number of carbon atoms of the fatty acid component of the ester was 18 (therefore, the molecular weight of the alkyl group contained in the fatty acid component was 16×14+15=239). The ratio (Ff/Fe) of the free fatty acid to the fatty acid component bonded to the ester bond was 1/99 (y=0.0101). The hydroxyl value of the ester was 10 mgKOH/g. The molecular weight was calculated from these values by the method specified in this text. The number of mols of the hydroxyl group contained in 1 mol of the fatty acid ester was 0.149, the number of mols (P) of the ester component (that is, alcohol component) contained in 1 mol of the fatty acid ester was 0.97, and the number of mols (Q) of the free fatty acid was 0.03.

(Other Additives)

EPQ: Stabilizer Mixture Containing tetrakis(2,4-di-tert-butylphenyl)-4,4'-biphenylene diphosphonite as the main component and about 10 wt % of tris(2,4-di-tert-butylphenyl)phosphite (Sandstab P-EPQ of Clariant)

HP: hindered phenol-based antioxidant (Irganox 1076 of Ciba Specialty Chemicals K.K.)

Referential Example 1

A pellet was obtained in the same manner as in Example 1 except that a parting agent, ultraviolet light absorber and other additives were not blended with the polycarbonate resin (PC) used in Example 1. The obtained pellet was molded in the same manner as in Example 1. The evaluation results of the obtained molded product are shown in Table 3.

TABLE 1

| | Item | | Unit | C. EX. 1 | C. Ex. 2 | Ex. 1 | Ex. 2 | Ex. 3 | Ex. 4 |
|---|---|---|---|---|---|---|---|---|---|
| Composition | Component A | PC | Part by weight | 100 | 100 | 100 | 100 | 100 | 100 |
| | Component B | B-1 | Part by weight | 0.3 | 0.3 | 0.3 | 0.3 | 0.3 | 0.5 |
| | Component C | C-1 | Part by weight | | | 0.1 | 0.1 | 0.1 | 0.05 |
| | | C-2 | Part by weight | | 0.1 | | | | |
| | Others | EPQ | Part by weight | | | | 0.03 | 0.03 | 0.03 |
| | | HP | Part by weight | | | | | 0.03 | 0.03 |

TABLE 1-continued

|  | Item | Unit | C. EX. 1 | C. Ex. 2 | Ex. 1 | Ex. 2 | Ex. 3 | Ex. 4 |
|---|---|---|---|---|---|---|---|---|
| Characteristic properties of molded product | Deposit on a metal mold | Amount | mg | 0.28 | 0.37*[1] | 0.29 | 0.29 | 0.28 | 0.48 |
| | Releasability | Release load | % | 100 | 64 | 69 | 69 | 67 | 80 |
| | Transparency | Haze | % | 0.4 | 0.4 | 0.4 | 0.4 | 0.4 | 0.4 |
| | Color | YI value | — | 0.5 | 0.6 | 0.6 | 0.5 | 0.4 | 0.5 |
| | Resistance to molding heat | ΔYI value | — | 0.3 | 0.5 | 0.3 | 0.2 | 0.1 | 0.1 |
| | Resistance to ultraviolet radiation | ΔYI value | — | 9.0 | 8.8 | 8.9 | 8.7 | 8.6 | 7.0 |
| | Productibility | | — | X | X | ◎ | ◎ | ◎ | ◎ |

Ex. = Example,
C. Ex. = Comparative Example
*[1] The weight of the deposit was 2.13 mg.

TABLE 2

|  | Item |  | Unit | Ex. 5 | Ex. 6 | Ex. 7 |
|---|---|---|---|---|---|---|
| Composition | Component A | PC | Part by weight | 100 | 100 | 100 |
| | Component B | B-1 | Part by weight | 0.3 | 0.3 | 0.3 |
| | Component C | C-3 | Part by weight | 0.1 | 0.1 | |
| | | C-4 | Part by weight | | | 0.1 |
| | Others | EPQ | Part by weight | 0.03 | 0.03 | 0.03 |
| | | HP | Part by weight | | 0.03 | 0.03 |
| Characteristic properties of molded product | Deposit on a metal mold | Amount | mg | 0.29 | 0.28 | 0.28 |
| | Releasability | Release load | % | 83 | 82 | 85 |
| | Transparency | Haze | % | 0.4 | 0.4 | 0.4 |
| | Color | YI value | — | 0.4 | 0.4 | 0.4 |
| | Resistance to molding heat | ΔYI value | — | 0.2 | 0.3 | 0.3 |
| | Resistance to ultraviolet radiation | ΔYI value | — | 8.7 | 8.6 | 8.8 |
| | Productibility | | — | ○ | ○ | ○ |

Ex. = Example,
C. Ex. = Comparative Example

TABLE 3

|  | Item |  | Unit | C. Ex. 3 | C. Ex. 4 | C. Ex. 5 | C. Ex. 6 | R. Ex. 1 |
|---|---|---|---|---|---|---|---|---|
| Composition | Component A | PC | Part by weight | 100 | 100 | 100 | 100 | 100 |
| | Component B | B-2 | Part by weight | | 0.3 | | | |
| | | B-3 | Part by weight | | | 0.3 | | |
| | | B-4 | Part by weight | | | | 0.3 | |
| | Component C | C-1 | Part by weight | 0.1 | 0.1 | 0.1 | 0.1 | |
| Characteristic properties of molded product | Deposit on a metal mold | Amount | mg | — | 11.8 | 1.55 | 1.28 | — |
| | Releasability | Release load | % | 71 | 70 | 71 | 69 | — |
| | Transparency | Haze | % | 0.4 | 0.4 | 0.4 | 0.4 | 0.4 |
| | Color | YI value | — | 0.4 | 0.8 | 1.2 | 2.3 | 0.1 |
| | Resistance to molding heat | ΔYI value | — | 0.3 | 0.5 | 0.7 | 0.4 | 0.3 |
| | Resistance to ultraviolet radiation | ΔYI value | — | 14.0 | 8.0 | 8.5 | 7.4 | 13.5 |
| | Productibility | | — | — | X | Δ | Δ | — |

C. Ex. = Comparative Example,
R. Ex. = Referential Example

As obvious from Tables 1 to 3, it is understood that the resin composition of the present invention provides molded articles having extremely excellent transparency, color, releasability and weatherability. Molded articles having all the above excellent properties are not obtained from compositions shown in Comparative Examples.

Figure 2:
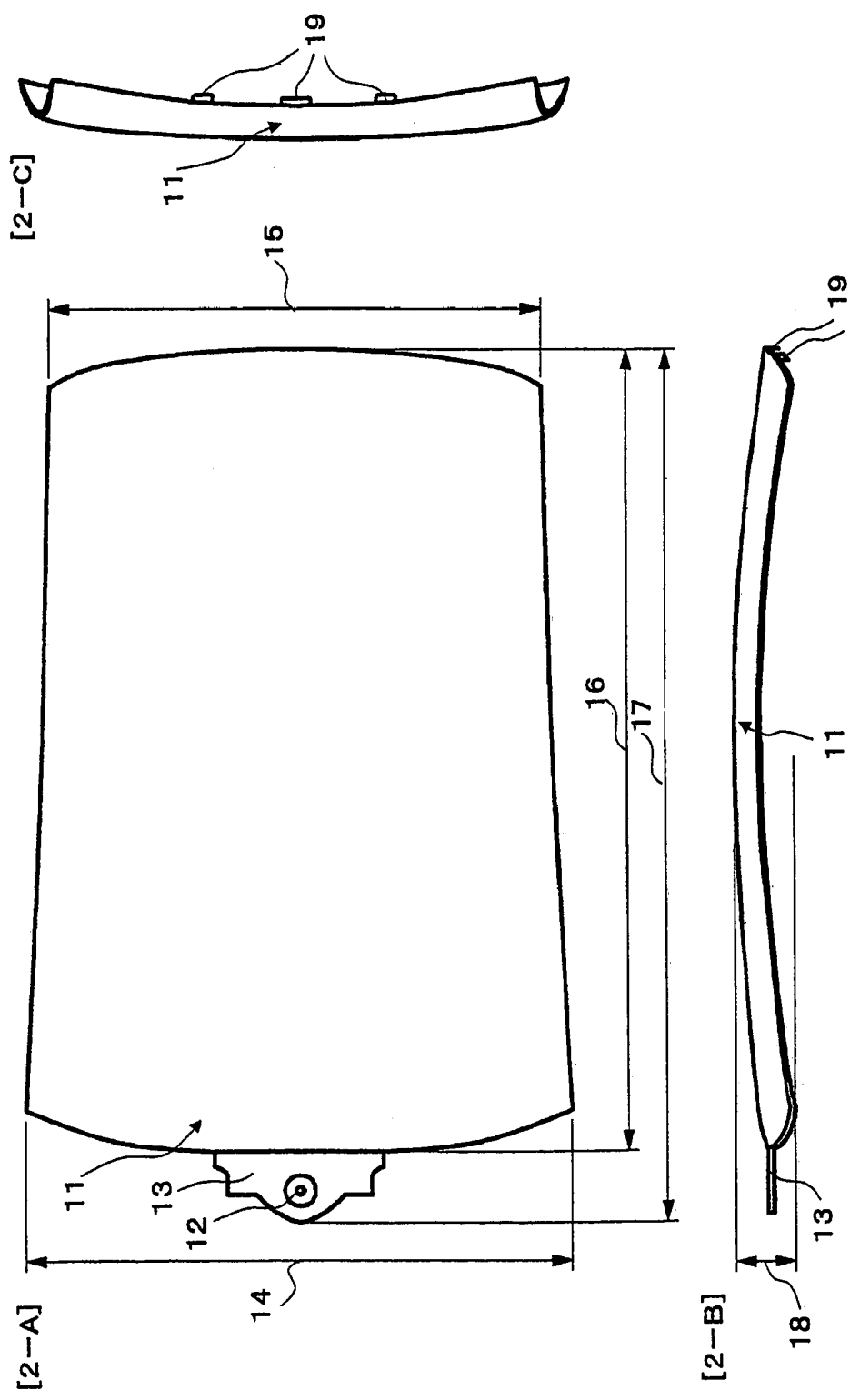
FIGS. 2 are schematic diagrams of a molded transparent car roof obtained in Examples which has a 3-D shape with a gently curved surface, wherein FIG. [2-A] is a front view (projection on the platen surface at the time of molding), FIG. [2-B] is a side view in a longitudinal direction and FIG. [2-C] is a side view when seen from the flow end side.

Further, car transparent roofs shown in FIG. 2 were manufactured by injection press molding the pellets obtained in Examples 3 with a large-size molding machine capable of injection press molding and having a platen four-axis parallel control unit (MDIP2100 of Meiki Co., Ltd. having a maximum clamping force of 33,540 kN). The molding machine is equipped with a hopper drier having the same drying capability as described above and the pellet dried by this drier was used for molding.

Molding was carried out at a cylinder temperature of 300° C., a hot runner set temperature of 290° C., a mold temperature of 120° C. on a fixed side and 110° C. on a movable side, a filling time of 24 sec, a press stroke of 5 mm and a cooling time of 150 sec. The parting surface of the movable mold did not contact the parting surface of the fixed mold at the last forward movement position. The valve gate type hot runner of Mold-Masters Limited. (diameter of 7 mm) was used as a runner, mold compression was started right before the end of filling, and the valve gate was closed right after the end of filling in order to prevent a back flow of the molten resin from the gate into the cylinder. After 50 shots of molding were carried out continuously, no deposit on a metal mold was observed for all the pellets, and a molded car transparent roofs from the pellet obtained in Example 3 had excellent color.

INDUSTRIAL FEASIBILITY

The present invention provides a polycarbonate resin composition suitable for use in car lamp lenses and covers and car glazing materials. Besides the above application purposes, the resin composition of the present invention can be used for a wide variety of application purposes such as window glass for construction machinery, window glass for buildings, houses and greenhouses, roofs for garages and arcades, illuminator lenses, lenses for signals, lenses for optical equipment, mirrors, spectacles lenses, goggles, muffling walls, motorbike windshields, face plates, solar cell covers and solar cell substrates, covers for display devices, touch panels, and parts (e.g., circuit covers, chasses and pinball conveyor guides) for game machines (e.g., pinball machines) owing to its characteristic features. Therefore, the polycarbonate resin composition of the present invention is useful in application fields such as electronic and electric appliances, OA equipment, car parts, mechanical parts, agricultural materials, fishing materials, conveyor containers, packing containers, play tools and other miscellaneous goods and provides a marked industrial effect.

What is claimed is:

1. A polycarbonate resin composition comprising:
   (1) 100 parts by weight of a polycarbonate resin (component A);
   (2) 0.01 to 10 parts by weight of at least one ultraviolet light absorber (component B) which is a cyclic imino ester represented by the following general formula (I); and
   (3) 0.01 to 1 part by weight of a fatty acid ester compound (component C) which is a full ester of an aliphatic polyhydric alcohol having 4 to 8 hydroxyl groups and 5 to 30 carbon atoms and an aliphatic carboxylic acid having 10 to 22 carbon atoms, a molecular weight of 500 to 2,000 g/mol and a hydroxyl value of 0.1 to 30:

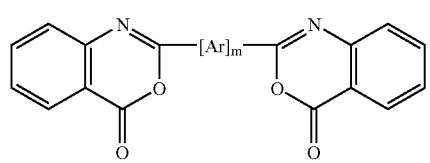

(I)

wherein Ar is a divalent aromatic hydrocarbon group having 6 to 12 carbon atoms, which may contain a hetero atom, and m is 0 or 1.

2. The polycarbonate resin composition of claim 1, wherein the aliphatic polyhydric alcohol is pentaerythritol.

3. The polycarbonate resin composition of claim 1, wherein the cyclic imino ester (component B) is a compound of the above formula (I) in which Ar is a 1,4-phenylene group, and m is 1.

4. The polycarbonate resin composition of claim 1, wherein component C is a substantially full ester of pentaerythritol and an aliphatic carboxylic acid having 10 to 22 carbon atoms.

5. The polycarbonate resin composition of claim 1, wherein component C has a hydroxyl value of 2 to 20.

6. The polycarbonate resin composition of claim 1, wherein component C has an esterification rate of 80% or more based on the total of all the hydroxyl groups of an aliphatic polyhydric alcohol.

7. A polycarbonate resin composition obtained by blending:
   (1) 100 parts by weight of a polycarbonate resin (component A);
   (2) 0.01 to 10 parts by weight of at least one ultraviolet light absorber (component B) which is a cyclic imino ester represented by the following general formula (I); and
   (3) 0.01 to 1 part by weight of a fatty acid full ester compound (component C') which is a full ester of an aliphatic polyhydric alcohol having 4 to 8 hydroxyl groups and 5 to 30 carbon atoms and an aliphatic carboxylic acid having 10 to 22 carbon atoms, a molecular weight of 500 to 2,000 g/mol, a hydroxyl value of 0.1 to 30 and an acid value of 4 to 20:

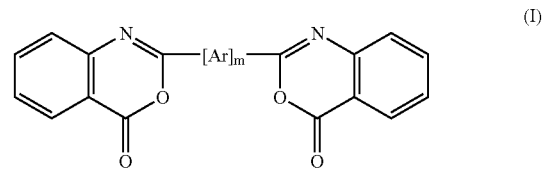

(I)

wherein Ar is a divalent aromatic hydrocarbon group having 6 to 12 carbon atoms which may contain a hetero atom, and m is 0 or 1.

8. A molded article obtained by melt molding the polycarbonate resin composition of claim 1 or 7.

9. The molded article of claim 8 which is a transparent member for vehicles.

10. The molded article of claim 9, wherein the transparent member for vehicles is a car lamp cover or lens.

11. The molded article of claim 9, wherein the transparent member for vehicles is a car glazing material.

12. A method of manufacturing a car lamp cover or lens by injection molding the polycarbonate resin composition of claim 1 or 7.

13. A vehicle comprising a lamp cover or lens obtained by injection molding the polycarbonate resin composition of claim 1 or 7 as a member.

* * * * *